(12) United States Patent
Yu et al.

(10) Patent No.: US 12,540,339 B2
(45) Date of Patent: Feb. 3, 2026

(54) GERMACRENE SYNTHASE SGTPS7 PROTEIN, CODING GENE AND USE IN SYNTHESIS OF GERMACRENE

(71) Applicant: Research Institute of Tropical Forestry, Chinese Academy of Forestry, Guangzhou (CN)

(72) Inventors: Niu Yu, Guangzhou (CN); Mingliang Dong, Guangzhou (CN); Jinchang Yang, Guangzhou (CN)

(73) Assignee: Research Institute of Tropical Forestry, Chinese Academy of Forestry, Guangzhou (CN)

( * ) Notice: Subject to any disclaimer, the term of this patent is extended or adjusted under 35 U.S.C. 154(b) by 0 days.

(21) Appl. No.: 19/186,618

(22) Filed: Apr. 23, 2025

(65) Prior Publication Data
US 2025/0250591 A1    Aug. 7, 2025

(30) Foreign Application Priority Data

Apr. 24, 2024   (CN) .................... 202410495340.X

(51) Int. Cl.
  *C12P 5/00*   (2006.01)
  *C12N 1/21*   (2006.01)
  *C12N 9/88*   (2006.01)

(52) U.S. Cl.
  CPC ............. *C12P 5/002* (2013.01); *C12N 9/88* (2013.01); *C12Y 402/03075* (2013.01)

(58) Field of Classification Search
  None
  See application file for complete search history.

(56) References Cited

FOREIGN PATENT DOCUMENTS

| CN | 109097350 A |   | 12/2018 |           |
|----|-------------|---|---------|-----------|
| CN | 118147121 A | * | 6/2024  | C12N 15/70|

OTHER PUBLICATIONS

Yu et al., The diesel tree Sindora glabra genome provides insights into the evolution of Oleoresin biosynthesis, Frontiers Plant Sci. 12, 2022, 794830. (Year: 2022).*
Yu et al., Transcriptome analysis of oleoresin-producing tree Sindora Glabra and characterization of sesquiterpene synthases, Front. Plant Sci. 9, 2018, 1619. (Year: 2018).*
GenBank login No. KF218238.1, https://www.ncbi.nlm.nih.gov/nuccore/544280693, Sep. 23, 2013 (Sep. 23, 2013).
CNIPA, Notification of First Office Action for Chinese application CN202410495340.X, Aug. 27, 2024.
CNIPA, Notification to grant patent right for Chinese application CN202410495340.X, Oct. 29, 2024.

* cited by examiner

*Primary Examiner* — Todd M Epstein
(74) *Attorney, Agent, or Firm* — Zhigang Ma

(57) ABSTRACT

The present disclosure discloses a germacrene synthase SgTPS7 protein, a coding gene and a use in synthesizing germacrene, relating to the technical field of germacrene synthesis of *Sindora glabra* Merr. ex de Wit. The present disclosure isolates a gene of germacrene synthase D from the genome of *Sindora glabra* Mer. ex de Wit. The gene encodes the protein germacrene synthase D which can catalyze the production of germacrene and can be used for the production and application of germacrene.

2 Claims, 8 Drawing Sheets
Specification includes a Sequence Listing.

SEQUENCE LISTING

```
Sequence total quantity: 4
SEQ ID NO: 1            moltype = AA   length = 548
FEATURE                 Location/Qualifiers
source                  1..548
                        mol_type = protein
                        note = SgTPS7 gene encoded protein
                        organism = synthetic construct
SEQUENCE: 1
MTRSTAGFTP SVWGNQFLSV ASSPSMKNKR VEIHQYLQNL KQQLERQLKS VEEPSEKLNL   60
IDTMQRLGVS YHFQSEIEES LKHLHKNPPP SWNAKDIDSH LLGIALWFRL LRQQGYYVSC  120
DIFNKFKDEK GDFKTTLIND VEGMLALYEA AYLGIRGEEI LDQMLEFTTS YLKSRLNDMT  180
PYLQERTNRA LYCPIHKGLP KIETRYYISM YSKKDSRNDL LLEFAILDFN ILQQQYQKEL  240
SYITEWFKKL DFVSKVPYTR DRIVEGYFWP LGAYFEKQYS KGRRIVAKII GAFSSLDDTY  300
DNFGTVDELN VFTEAIMRWD INLVASLPES MKVVFENILN LLIEIELLTE EDEISFAVEY  360
VKQGIQGLVT GYMLEAEWRG RGYIPTYEDY IANGIWTAGY PALEIISLLG LGNIATREVF  420
DWISSMPKIV RASGIVGRIG NDLASHKREQ NSGHVATSVE CYMKQYGISE DEAYKLLLKE  480
IENAWKDLNE EYMKPNGIPK VVLERVRNFS RASEFFYGRF VDNYTNGERL KDHIAALFLD  540
PIAIDHNK                                                          548

SEQ ID NO: 2            moltype = DNA  length = 1647
FEATURE                 Location/Qualifiers
source                  1..1647
                        mol_type = other DNA
                        note = nucleotide of the SgTPS7 gene
                        organism = synthetic construct
SEQUENCE: 2
atgactagat ccacagcagg cttcactcct agtgtttggg gaaatcagtt cctttccgtt   60
gcttccagcc cctcgatgaa gaacaaaaga gtggaaattc atcaatattt acagaatctg  120
aaacaacaac tggagagaca gctaaaaagt gttgaagagc cctctgaaaa attaaacttg  180
atcgatacca tgcaacgttt aggagtgtct taccattttc aaagtgagat cgaagaatca  240
```

```
ttaaaacatc tgcataagaa tcctcctcct tcctggaatg ccaaagatat cgattctcat    300
cttttgggca ttgctctttg gtttcggctg cttagacaac aaggctatta cgtatcatgc    360
gatatattta acaaatttaa agatgagaaa ggtgatttca agacaacatt gatcaatgat    420
gtggaaggaa tgctagcctt atatgaagct gcatatctcg gtatccgtgg agaagaaatt    480
cttgatcaaa tgctagaatt tacaacgtct taccttaagt caaggttgaa tgacatgaca    540
ccctacctte aagaaagaac aaatcgtgct ttgtactgtc ctatacacaa aggcttacca    600
aaaattgaga ccagatatta catttctatg tattcaaaaa aggattctcg gaatgatctg    660
ctactagaat ttgcgatact agatttcaat atccttcaac aacaatatca gaaggaatta    720
agctacatca cagagtggtt taaaaaatta gatttcgtga gcaaggttcc ttacaccaga    780
gacagaattg ttgaaggcta cttttggcct ttgggagcat actttgagaa gcaatatagc    840
aaaggaagaa gaattgtggc caaaattatt ggtgcttttt catctttgga tgatacttat    900
gataacttcg gcacagtgga tgaactcaat gtctttactg aagcaattat gagatgggat    960
attaatctag tagcttctct ccctgaatcc atgaaagtgg tatttgaaaa tatttaaat   1020
ttgttgattg aaatagagtt gttaaccgaa gaggacgaaa tatcctttgc tgttgaatat   1080
gttaaacaag ggattcaagg tttagtgaca ggatacatgc ttgaagctga gtggagggc   1140
agaggctaca taccaacata tgaggactac atagcgaatg aatttggac cgctggttac   1200
ccagcccttg aaataatatc cttacttggt ctcggaaata tcgcaacccg agaggtgttt   1260
gattggattt ctagtatgcc taaaattgtt agagcttcag gaattgtggg cagaatagga   1320
aatgatttgg cttctcataa gagggaacaa aatagcggac atgttgcaac ttcagttgag   1380
tgttacatga agcaatatgg gatttcagaa gatgaagcct ataaactact acttaaggag   1440
atagagaatg catggaaaga tcttaacgaa gagtatatga agccaaatgg tataccaaaa   1500
gtggtacttg agcgtgtacg gaattctctcg cgtgcaagtg agtttttcta tggtcgcttt   1560
gttgataatt acacaaatgg agagaggctg aaggatcaca ttgctgcact ttttctggat   1620
cccatagcaa ttgatcacaa taaatag                                        1647

SEQ ID NO: 3              moltype = DNA   length = 1681
FEATURE                   Location/Qualifiers
source                    1..1681
                          mol_type = other DNA
                          note = base sequence of SgTPS7 fusion protein
                          organism = synthetic construct
SEQUENCE: 3
catatgcatc atcatcatca tcacggtcgt ccgaccgcaa attttagtcc gagcgtttgg     60
ggcaaccagt ttttatctat tgcgagcggt ccgctgctga aaaacaaaga agcggagatc    120
caccagcatc tgctgaacct gaaagaacag gtccgctgaa agctgaaaaa cggcgttgaa    180
gaaccgagcg agaaactgaa cctgatcgat accatccaac gtctgggcgt tagccatcat    240
ttcgaacgcg aaatcgaaga gagcctgaaa catctgcata aaaacccgcc gagtagttgg    300
aacgcagaag atatcgacgc gcatctgctg tctatcagtc tgtggtttcg tctgttacgt    360
cagcagggct attacgttag ctgcgacgtt ttcgacaaat tcaaagacga caaaggcatg    420
ttcaaaacca ccctgattga cgacgtgaa ggtatgttag cgctgtacga agcaacctat    480
ctgggtattc gcggcgaaga aatcctggat caggttctgg agttcaccat gttccacctg    540
aaaagccgtc tggaaggcat gaccccgtat ttacgcgaaa cgcagatcg cgcattatat    600
tgtccgatca acaaggcct gccgcgtatt gaaacccgct acttcatcag catgtacagc    660
aaaaaagaca gccgtaacga tctgctgctg gaatttgcaa tgctggactt taacatcctg    720
cagcagtagt accagaaaga actgtctcac ctgagcgagt ggtacaaaaa actggacttc    780
gtcagcaaag tcccgtatac ccgcgatcgt attgtcgaag gctatttctg gccgttaggc    840
gcatatttcg agaaccagta caacaaaggc cgcatcatcg tcagcaaact gatcctggtt    900
ctgaccgcat tagacgatac ctacgacgca tacggtaccg ttgacgaact gaactgttc    960
accgaggcga ttaaacgctg gcacatcaac atgtcgctt ctttaccgga gtgcatgaaa   1020
gtcgtctttc aggcgatcct ggacttactg acgaaatgg aactgctgac cgaagctgaa   1080
ggtattagct gcttcgtcga atacgttaaa ccggcactgc aggatctggc taaaagctat   1140
ctgctgaag cagagtggcg cgataaaggt tacatcccga cctacgaaga atatatcgcg   1200
aacggcgttt tagctgcgg ttatccggcc gttgaaatgg caagtctgct gggtctgggc   1260
aaaattgcga ccaagaagt cttcgattgg atcagcaacg ttccgaaaat tgttcgcgcg   1320
tctagcatca tgtgccgttt aaccgacgat ctggcaagcc acaaattcga acagaaccgc   1380
gaacacgtcg gttccgctat cgagtgctac atgaaacagt acggcgttag cgaagaagaa   1440
gcctataaaa tgctgctgaa agagatcgag aacggctgga agacctgaa cgaagaatat   1500
atgaaaccga acgcgttcc gaaagttgta ctgaaatgcg tcctgaactt cagccgcgtt   1560
attgaattcc tgtacggcca cttcgtcgac aaatacacca cgcggaaat gctgaaagac   1620
cacatcgcga gcctgtttgt tgatccgatt gccattgacg tcaacaaata atgaaagctt   1680
g                                                                   1681

SEQ ID NO: 4              moltype = AA    length = 554
FEATURE                   Location/Qualifiers
source                    1..554
                          mol_type = protein
                          note = SgTPS7 fusion protein
                          organism = synthetic construct
SEQUENCE: 4
MHHHHHHTRS TAGFTPSVWG NQFLSVASSP SMKNKRVEIH QYLQNLKQQL ERQLKSVEEP     60
SEKLNLIDTM QRLGVSYHFQ SEIEESLKHL HKNPPPSWNA KDIDSHLLGI ALWFRLLRQQ    120
GYYVSCDIFN KFKDEKGDFK TTLINDVEGM LALYEAAYLG IRGEEILDQM LEFTTSYLKS    180
RLNDMTPYLQ ERTNRALYCP IHKGLPKIET RYYISMYSKK DSRNDLLLEF AILDFNILQQ    240
QYQKELSYIT EWFKKLDFVS KVPYTRDRIV EGYFWPLGAY FEKQYSKGRR IVAKIIGAFS    300
SLDDTYDNFG TVDELNVFTE AIMRWDINLV ASLPESMKVV FENILNLLIE IELLTEEDEI    360
SFAVEYVKQG IQGLVTGYML EAEWRGRGYI PTYEDYIANG IWTAGYPALE IISLLGLGNI    420
```

```
ATREVFDWIS SMPKIVRASG IVGRIGNDLA SHKREQNSGH VATSVECYMK QYGISEDEAY    480
KLLLKEIENA WKDLNEEYMK PNGIPKVVLE RVRNFSRASE FFYGRFVDNY TNGERLKDHI    540
AALFLDPIAI DHNK                                                      554
```

GERMACRENE SYNTHASE SGTPS7 PROTEIN, CODING GENE AND USE IN SYNTHESIS OF GERMACRENE

SEQUENCE LISTING

The sequence listing is submitted as an XML file filed via EFS-Web, with a file name of "Sequence_Listing.XML", a creation date of Apr. 19, 2025, and a size of 9,796 bytes. The sequence Listing filed via EFS-Web is a part of the specification and is incorporated in its entirety by reference herein.

CROSS REFERENCE TO RELATED APPLICATIONS

The present disclosure claims the priority to the Chinese patent application with the filing No. 202410495340X, entitled "GERMACRENE SYNTHASE SgTPS7 PROTEIN, CODING GENE AND USE IN SYNTHESIS OF GERMACRENE" and filed on Apr. 24, 2024 with the Chinese Patent Office, the contents of which are incorporated herein by reference in their entirety.

TECHNICAL FIELD

The present disclosure relates to the technical field of synthesis of germacrene of *Sindora glabra* Merr. ex de Wit, and more specifically to a germacrene synthase SgTPS7 protein, a coding gene and a use in synthesis of germacrene.

BACKGROUND ART

Germacrene, a major member of the aromatic carbohydrate sesquiterpenes, has important antibacterial and insecticidal functions and is also an important aromatic component of essential oils. Germacrene contains five isomers, including germacrenes A-E, among which germacrene A and germacrene D are more widely distributed.

*Sindora glabra* Merr ex de Wit is a tall arbor tree of the Genus *Sindora* in the Family Caesalpiniaceae. The stems of *Sindora glabra* Merr. ex de Wit contain a large amount of sesquiterpenoid resin oils of more than 20 kinds, where the proportion of germacrene D reaches about 2.5%. Currently, germacrene is mainly extracted from plant tissues, which greatly limits the extraction yield and purity. The use of genetic engineering methods to produce and synthesize germacrene using *Escherichia coli* provides an effective solution for the mass production of germacrene.

Therefore, how to provide a gene and protein encoding germacrene synthase is a problem to be urgently solved by a person skilled in the art.

SUMMARY

In view of this, the present disclosure isolates a gene of germacrene synthase D from the genome of *Sindora glabra* Merr ex de Wit. The gene encodes the protein germacrene synthase D, which can catalyze the production of germacrene and can be used for the production and application of germacrene.

In order to achieve the above objects, the present disclosure adopts the following technical solution.

Germacrene synthase SgTPS7 protein, the amino acid sequence of the protein is as shown in SEQ ID NO. 1.

Further, the present disclosure further seeks to protect a gene, which encodes the protein sequence as shown in SEQ ID NO. 1.

Preferably, the gene is the SgTPS7 gene, and the nucleotide sequence is as shown in SEQ ID NO. 2.

Further, the present disclosure further seeks to protect the use of germacrene synthase SgTPS7 protein or a coding gene of the SgTPS7 protein in catalyzing FPP or GPP to form germacrene.

Further, the present disclosure further seeks to protect an expression element of germacrene synthase SgTPS7, where the expression element is a pET30a-SgTPS7 recombinant plasmid.

Further, the present disclosure further seeks to protect a method for synthesizing germacrene D, including steps of: transferring the pET30a-SgTPS7 recombinant plasmid into competent cells of *Escherichia coli*, culturing, centrifuging, resuspending and purifying to obtain the germacrene synthase SgTPS7 protein, and then catalyzing FPP or GPP using the SgTPS7 protein to obtain germacrene D.

It can be seen from the above technical solution that compared with the prior art, the present disclosure discloses a germacrene synthase SgTPS7 gene, and the SgTPS7 protein encoded thereby can catalyze FPP or GPP as a substrate to obtain the germacrene D, thereby realizing the mass production of the germacrene D.

BRIEF DESCRIPTION OF DRAWINGS

In order to more clearly illustrate the technical solutions of the embodiments of the present disclosure or in the prior art, the drawings required to be used the description of the embodiments or the prior art will be briefly introduced below. Apparently, the drawings described below are only embodiments of the present disclosure. For a person ordinarily skilled in the art, other drawings may be obtained based on the provided drawings without paying creative work.

DETAILED DESCRIPTION OF EMBODIMENTS

The technical solutions in embodiments of the present disclosure will be clearly and completely described below in conjunction with drawings in the embodiments of the present disclosure. Apparently, the described embodiments are only some, not all of the embodiments of the present disclosure. Based on the embodiments of the present disclosure, all other embodiments obtained by a person ordinarily skilled in the art without creative work shall fall within the scope of protection of the present disclosure.

Figure 1:
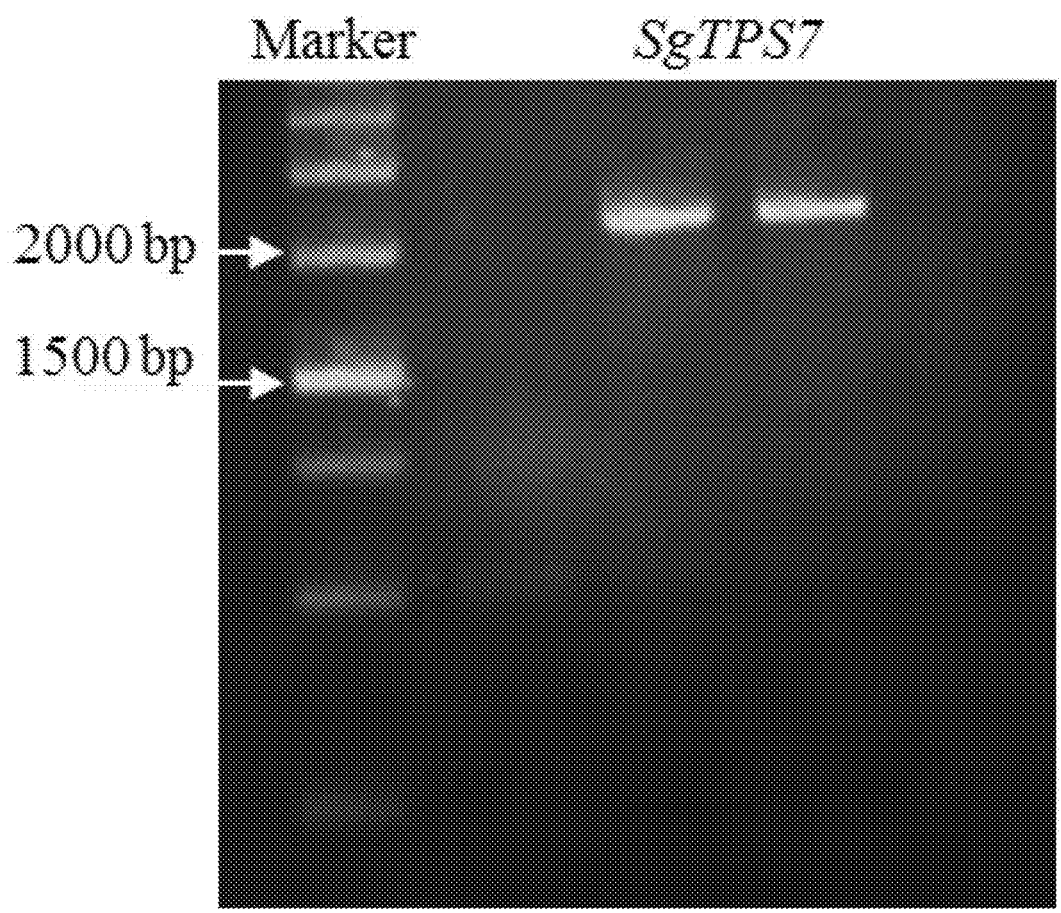
FIG. 1 is an agarose gel electrophoretogram of the PCR product of a SgTPS7 gene.

Example 1 Cloning of Germacrene Synthase D Gene SgTPS7 of *Sindora glabra* Merr. Ex De Wit With the stem tissue of *Sindora glabra* Merr. ex de Wit used as a material, the total RNA of roots, stems and leaves of *Sindora glabra* Merr. ex de Wit was extracted by using an RNA kit (TIANGEN, DP441), and the extracted RNA was reverse transcribed into cDNA using a reverse transcription kit (TARAKA, RR470). PCR amplification was performed using a high-fidelity enzyme (TAKARA, R045A), with the cDNA used as a template. The amplified product was detected by 1.2% agarose gel electrophoresis, as shown in FIG. 1, and then the target band was excised, purified and recovered (TIANGEN, DP214), connected to the pUCm-T vector, transformed into competent cells of *Escherichia coli* Trans-T1, and screened for positive clone colony. After PCR detection, the bacterial solution was sent to Sangon Biotech (Shanghai) Co., Ltd. for sequencing. The recombinant plasmid was extracted from the sequencing-verified sample.

The nucleotide of the SgTPS7 gene is as shown in SEQ ID NO. 2, and the encoded protein is as shown in SEQ ID NO. 1.

```
>SgTPS7
ATGACTAGATCCACAGCAGGCTTCACTCCTAGTGTTTGGGGAAATCAGTT
CCTTTCCGTTGCTTCCAGCCCCTCGATGAAGAACAAAAGAGTGGAAATTC
ATCAATATTTACAGAATCTGAAACAACAACTGGAGAGACAGCTAAAAAGT
GTTGAAGAGCCCTCTGAAAAATTAAACTTGATCGATACCATGCAACGTTT
AGGAGTGTCTTACCATTTTCAAAGTGAGATCGAAGAATCATTAAAACATC
TGCATAAGAATCCTCCTCCTTCCTGGAATGCCAAAGATATCGATTCTCAT
CTTTTGGGCATTGCTCTTTGGTTTCGGCTGCTTAGACAACAAGGCTATTA
CGTATCATGCGATATATTTAACAAATTTAAAGATGAGAAAGGTGATTTCA
AGACAACATTGATCAATGATGTGGAAGGAATGCTAGCCTTATATGAAGCT
GCATATCTCGGTATCCGTGGAGAAGAAATTCTTGATCAAATGCTAGAATT
TACAACGTCTTACCTTAAATCAAGGTTGAATGACATGACACCCTACCTTC
AAGAAAGAACAAATCGTGCTTTGTACTGTCCTATACACAAAGGCTTACCA
AAAATTGAGACCAGATATTACATTTCTATGTATTCAAAAAAGGATTCTCG
GAATGATCTGCTACTAGAATTTGCGATACTAGATTTCAATATCTTGCAAC
AACAATATCAGAAGGAATTAAGCTACATCACAGAGTGGTTTAAAAAATTA
GATTTCGTGAGCAAGGTTCCTTACACCAGAGACAGAATTGTTGAAGGCTA
CTTTTGGCCTTTGGGAGCATACTTTGAGAAGCAATATAGCAAAGGAAGAA
GAATTGTGGCCAAAATTATTGGTGCTTTTCATCTTTGGATGATACTTAT
GATAACTTCGGCACAGTGGATGAACTCAATGTCTTTACTGAAGCAATTAT
GAGATGGGATATTAATCTAGTAGCTTCTCTCCCTGAATCCATGAAAGTGG
TATTTGAAAATATTTTAAATTTGTTGATTGAAATAGAGTTGTTAACCGAA
GAGGACGAAATATCCTTTGCTGTTGAATATGTTAAACAAGGGATTCAAGG
TTTAGTGACAGGATACATGCTTGAAGCTGAGTGGAGGGGCAGAGGCTACA
TACCAACATATGAGGACTACATAGCGAATGGAATTTGGACCGCTGGTTAC
CCAGCCCTTGAAATAATATCCTTACTTGGTCTCGGAAATATCGCAACCCG
AGAGGTGTTTGATTGGATTTCTAGTATGCCTAAAATTGTTAGAGCTTCAG
GAATTGTGGGCAGAATAGGAAATGATTTGGCTTCTCATAAGAGGGAACAA
AATAGCGGACATGTTGCAACTTCAGTTGAGTGTTACATGAAGCAATATGG
GATTTCAGAAGATGAAGCCTATAAACTACTACTTAAGGAGATAGAGAATG
CATGGAAAGATCTTAACGAAGAGTATATGAAGCCAAATGGTATACCAAAG
GTGGTACTTGAGCGTGTACGGAATTTCTCGCGTGCAAGTGAGTTTTTCTA
TGGTCGCTTTGTTGATAATTACACAAATGGAGAGAGGCTGAAGGATCACA
TTGCTGCACTTTTTCTGGATCCCATAGCAATTGATCACAATAAATAG,
as shown in SEQ ID NO. 2.

>SgTPS7
MTRSTAGFTPSVWGNQFLSVASSPSMKNKRVEIHQYLQNLKQQLERQLKS
VEEPSEKLNLIDTMQRLGVSYHFQSEIEESLKHLHKNPPPSWNAKDIDSH
LLGIALWFRLLRQQGYYVSCDIFNKFKDEKGDFKTTLINDVEGMLALYEA
AYLGIRGEEILDQMLEFTTSYLKSRLNDMTPYLQERTNRALYCPIHKGLP
KIETRYYISMYSKKDSRNDLLLEFAILDFNILQQQYQKELSYITEWFKKL
DFVSKVPYTRDRIVEGYFWPLGAYFEKQYSKGRRIVAKIIGAFSSLDDTY
DNFGTVDELNVFTEAIMRWDINLVASLPESMKVVFENILNLLIEIELLTE
EDEISFAVEYVKQGIQGLVTGYMLEAEWRGRGYIPTYEDYIANGIWTAGY
PALEIISLLGLGNIATREVFDWISSMPKIVRASGIVGRIGNDLASHKREQ
NSGHVATSVECYMKQYGISEDEAYKLLLKEIENAWKDLNEEYMKPNGIPK
VVLERVRNFSRASEFFYGRFVDNYTNGERLKDHIAALFLDPIAIDHNK*,
as shown in SEQ ID NO. 1.
```

Figure 2:
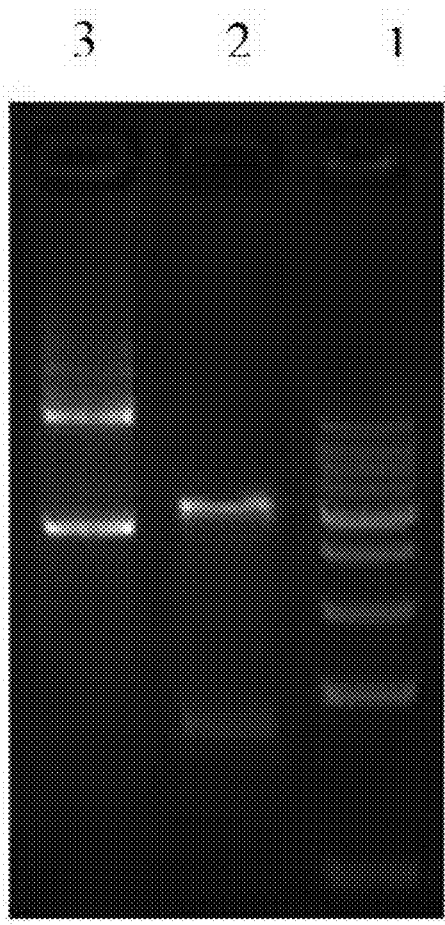
FIG. 2 is an enzyme digestion electrophoretogram of a pET30a-SgTPS7 vector; 1: Plasmid DNA; 2: digested with NdeI/HindIII; 3: DNA Marker.

Example 2 Construction of Prokaryotic Expression Vector of Germacrene Synthase D Gene SgTPS7 of *Sindora glabra* Merr. Ex De Wit The amino acid sequence of SgTPS7 protein was optimized using the codon optimization software MaxCodon™ Optimization Program (V13), SgTPS7 gene was inserted into the expression vector pET30a by using whole gene synthesis and through restriction enzyme digestion sites NdeI and HindIII, and the accuracy of the final expression vector was confirmed by an enzyme digestion method and sequencing, as shown in FIG. 2.

Figure 3:
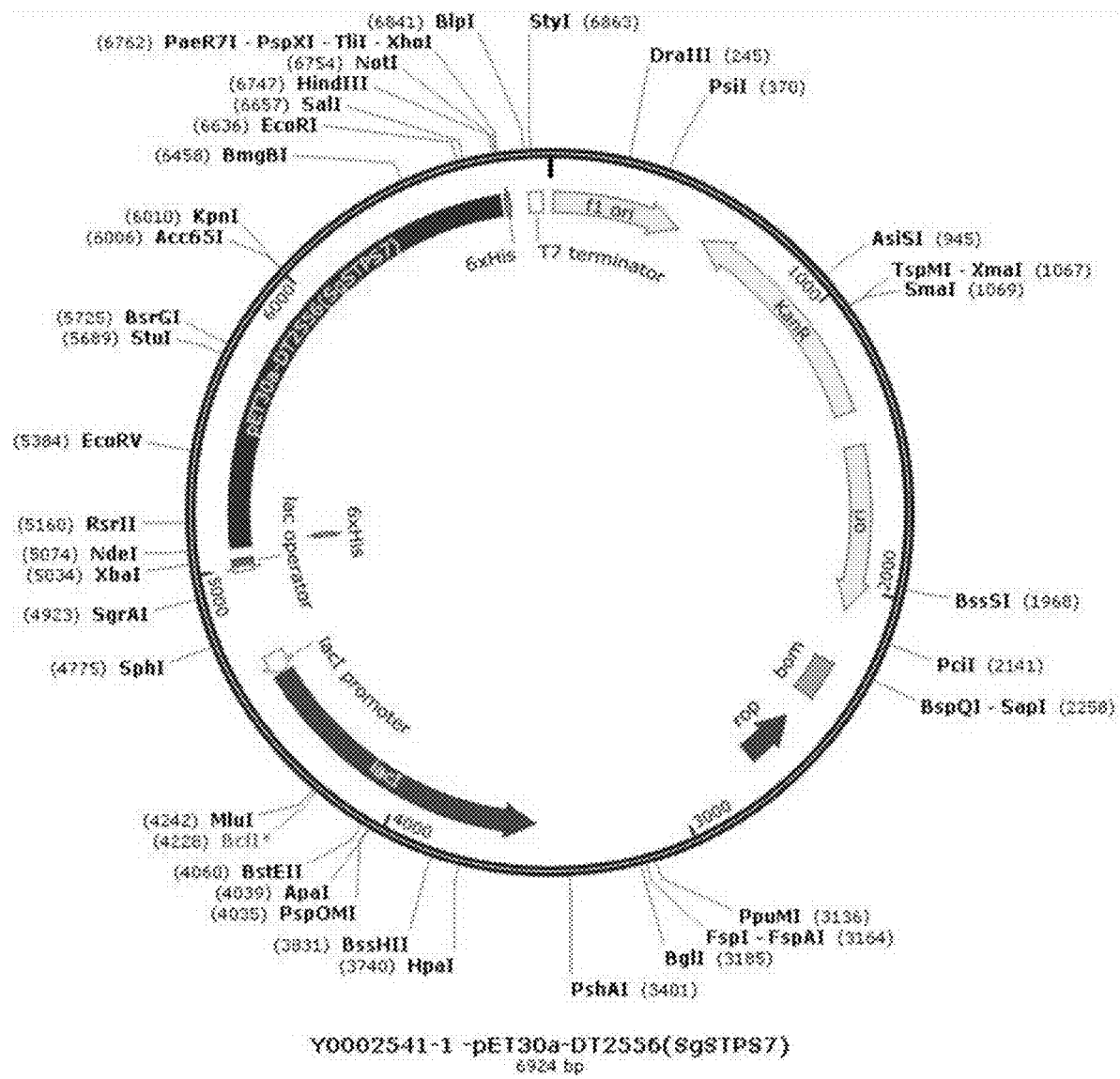
FIG. 3 is a structural view of the pET30a-SgTPS7 vector.

The structural view of the pET30a-SgTPS7 vector is as shown in FIG. 3.

The base sequence of SgTPS7 fusion protein is as follows:

```
>His-SgTPS7
CATATGCATCATCATCATCATCACGGTCGTCCGACCGCAAATTTTAGTCC
GAGCGTTTGGGGCAACCAGTTTTTATCTATTGCGAGCGGTCCGCTGCTGA
```

-continued
```
AAAACAAAGAAGCGGAGATCCACCAGCATCTGCTGAACCTGAAAGAACAG

GTCCGCAAACAGCTGAAAAACGGCGTTGAAGAACCGAGCGAGAAACTGAA

CCTGATCGATACCATCCAACGTCTGGGCGTTAGCCATCATTTCGAACGCG

AAATCGAAGAGAGCCTGAAACATCTGCATAAAAACCCGCCGAGTAGTTGG

AACGCAGAAGATATCGACGCGCATCTGCTGTCTATCAGTCTGTGGTTTCG

TCTGTTACGTCAGCAGGGCTATTACGTTAGCTGCGACGTTTTCGACAAAT

TCAAAGACGACAAAGGCATGTTCAAAACCACCCTGATTGACGACGTCGAA

GGTATGTTAGCGCTGTACGAAGCAACCTATCTGGGTATTCGCGGCGAAGA

AATCCTGGATCAGGTTCTGGAGTTCACCATGTTCCACCTGAAAAGCCGTC

TGGAAGGCATGACCCCGTATTTACGCGAACGCGCAGATCGCGCATTATAT

TGTCCGATCAACAAAGGCCTGCCGCGTATTGAAACCCGCTACTTCATCAG

CATGTACAGCAAAAAGACAGCCGTAACGATCTGCTGCTGGAATTTGCAA

TGCTGGACTTTAACATCCTGCAGCAGCAGTACCAGAAAGAACTGTCTCAC

CTGAGCGAGTGGTACAAAAAACTGGACTTCGTCAGCAAAGTCCCGTATAC

CCGCGATCGTATTGTCGAAGGCTATTTCTGGCCGTTAGGCGCATATTTCG

AGAACCAGTACAACAAAGGCCGCATCATCGTCAGCAAACTGATCCTGGTT

CTGACCGCATTAGACGATACCTACGACGCATACGGTACCGTTGACGAACT

GAAACTGTTCACCGAGGCGATTAAACGCTGGGACATCAACATGGTCGCTT

CTTTACCGGAGTGCATGAAAGTCGTCTTTCAGGCGATCCTGGACTTACTG

GACGAAATGGAACTGCTGACCGAAGCTGACGGTATTAGCTGCTTCGTCGA

ATACGTTAAACCGGCACTGCAGGATCTGGCTAAAAGCTATCTGCTGGAAG

CAGAGTGGCGCGATAAAGGTTACATCCCGACCTACGAAGAATATATCGCG

AACGGCGTTTTTAGCTGCGGTTATCCGGCCGTTGAAATGGCAAGTCTGCT

GGGTCTGGGCAAAATTGCGACCAAAGAAGTCTTCGATTGGATCAGCAACG

TTCCGAAAATTGTTCGCGCGTCTAGCATCATGTGCCGTTTAACCGACGAT

CTGGCAAGCCACAAATTCGAACAGAACCGCGAACACGTCGGTTCCGCTAT

CGAGTGCTACATGAAACAGTACGGCGTTAGCGAAGAAGAAGCCTATAAAA

TGCTGCTGAAAGAGATCGAGAACGGCTGGAAAGACCTGAACGAAGAATAT

ATGAAACCGAACGGCGTTCCGAAAGTTGTACTGAAATGCGTCCTGAACTT

CAGCCGCGTTATTGAATTCCTGTACGGCCACTTCGTCGACAAATACACCA

ACGCGGAAATGCTGAAAGACCACATCGCGAGCCTGTTTGTTGATCCGATT

GCCATTGACGTCAACAAATAATGAAAGCTTG, as shown in

SEQ ID NO. 3.
```

The sequence of SgTPS7 fusion protein is as follows:

```
>His-SgTPS7
MHHHHHHTRSTAGFTPSVWGNQFLSVASSPSMKNKRVEIHQYLQNLKQQL

ERQLKSVEEPSEKLNLIDTMQRLGVSYHFQSEIEESLKHLHKNPPPSWNA

KDIDSHLLGIALWFRLLRQQGYYVSCDIFNKFKDEKGDFKTTLINDVEGM

LALYEAAYLGIRGEEILDQMLEFTTSYLKSRLNDMTPYLQERTNRALYCP

IHKGLPKIETRYYISMYSKKDSRNDLLLEFAILDFNILQQQYQKELSYIT

EWFKKLDFVSKVPYTRDRIVEGYFWPLGAYFEKQYSKGRRIVAKIIGAFS

SLDDTYDNFGTVDELNVFTE AIMRWDINLVASLPESMKVV

FENILNLLIE IELLTEEDEISFAVEYVKQG

IQGLVTGYMLEAEWRGRGYI PTYEDYIANG IWTAGYPALE

IISLLGLGNIATREVFDWIS SMPKIVRASG IVGRIGNDLA

SHKREQNSGHVATSVECYMKQYGISEDEAYKLLLKEIENAWKDLNEEYMK

PNPGIPKV VLE RVRNFSRASE

FFYGRFVDNYTNGERLKDHIAALFLDPIAI DHNK, as shown in

SEQ ID NO. 4.
```

Figure 4:
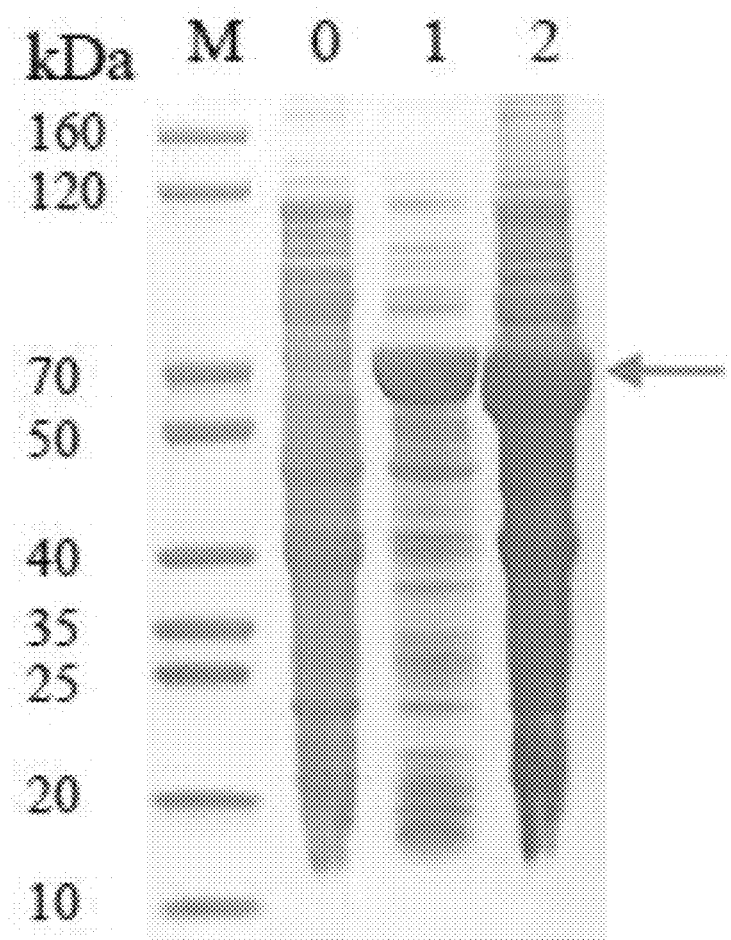
FIG. 4 is a view showing expression of TPS7 protein in BL21 (DE3) analyzed by SDS-PAGE; M: SDS-PAGE Protein Marker; 0: control (without IPTG); 1: 15° C. induction for 16 h; 2: 37° C. induction for 16 h.

Example 3 Purification of Germacrene Synthase D Gene SgTPS7 Protein of *Sindora glabra* Merr. Ex De Wit The constructed plasmid containing TPS7 gene was transformed into BL21(DE3) competent cells, then evenly spread on an LB plate (containing 50 µg/mL kanamycin sulfate), and then invertedly placed in a 37° C. incubator overnight. Monoclones were selected from the transformed plate, and inoculated into 4 mL of LB medium (containing 50 µg/mL kanamycin sulfate), and then cultured until $OD_{600}$ was 0.5-0.8, and then IPTG with a final concentration of 0.2 mM was added to the liquid culture medium in a test tube, and then placed at 15° C. and 37° C. respectively to induce expression. The induced liquid culture medium was collected and centrifuged at 12,000 rpm for 5 min, added with PBS solution after removing the supernatant to resuspend the precipitate, and finally added with SDS-PAGE loading buffer. The sample was heated at 100° C. for 10 min, and then centrifuged, and the supernatant was collected for electrophoresis. Electrophoresis was performed at a constant voltage of 160 V until the bromophenol blue band migrated to 1 cm from the bottom of the gel. The gel was taken out and stained and destained using a protein gel rapid processing system. The results are shown in FIG. 4. The arrow indicates the SgTPS7 protein.

Figure 5:
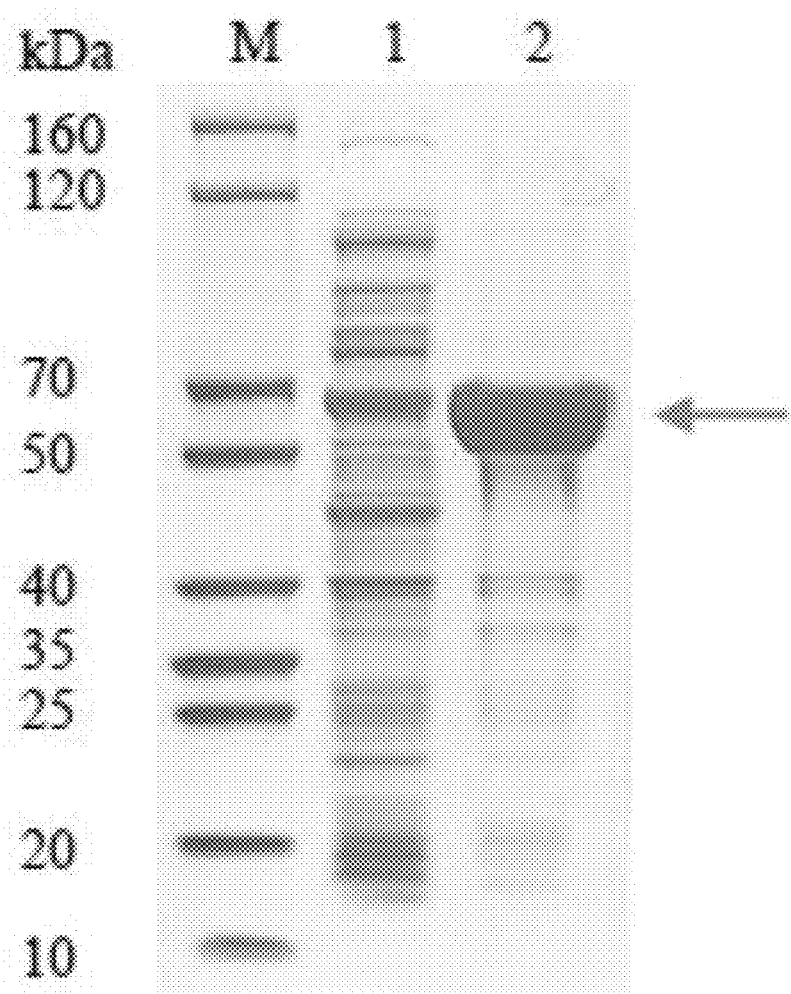
FIG. 5 is a view showing the solubility result of TPS7 protein analyzed by SDS-PAGE; M: SDS-PAGE Protein Marker; 1: supernatant after whole bacteria lysis; 2: precipitate after whole bacteria lysis.

Example 4 Scale-Up Culturing of SgTPS7 Protein Encoded by Germacrene Synthase D Gene of *Sindora glabra* Merr Ex De Wit Scale-up culturing was performed. When grown to $OD_{600}$=0.8, IPTG with a final concentration of 0.2 mM was added and induced at 15° C. for 16 h, and then the bacteria were collected. The whole bacteria were ultrasonically lysed with 50 mM Tris (pH 8.0), 300 mM NaCl, 20 mM Imidazole containing 1% Triton X-100, 1 mM DTT, and 1 mM PMSF, and the supernatant was collected, and the supernatant and precipitate were analyzed and detected by SDS-PAGE, as shown in FIG. 5. The arrow indicates the SgTPS7 protein.

Figure 6:
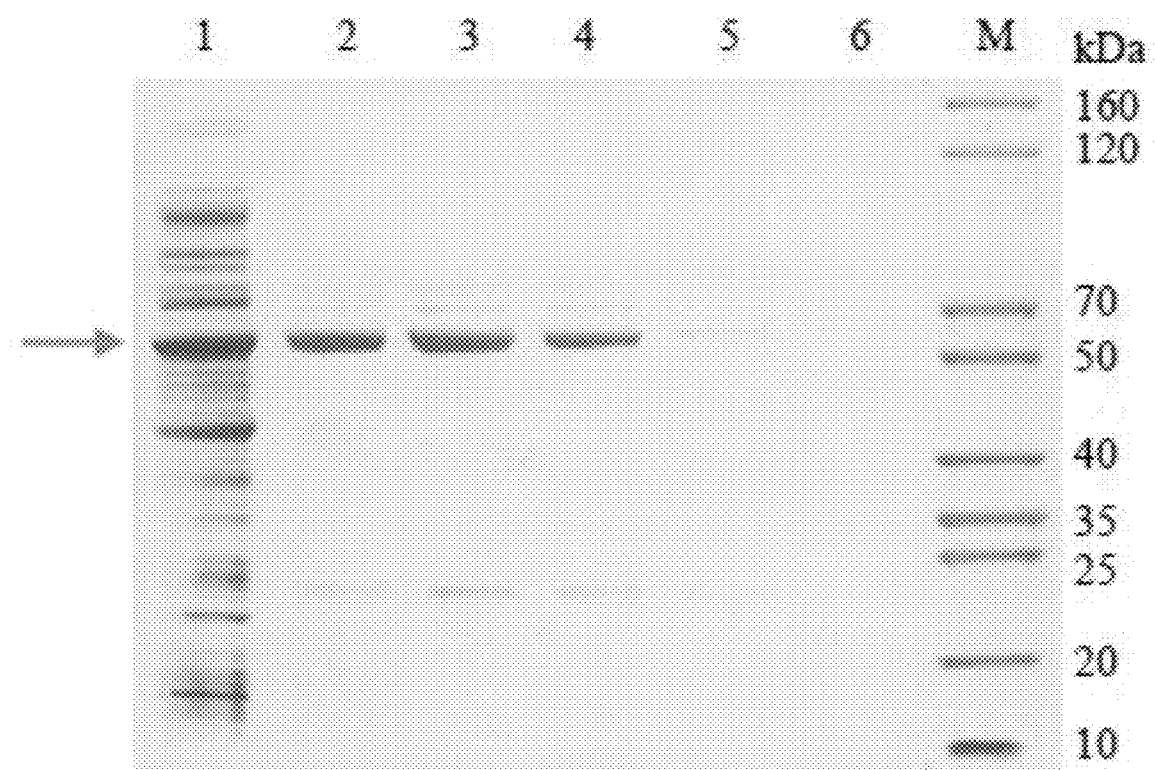
FIG. 6 shows the purification result of TPS7 protein supernatant analyzed by SDS-PAGE; M: SDS-PAGE Protein Marker; 1: flow-through after incubation of supernatant with Ni-IDA; 2-4: elution fractions of 100 mM Imidazole; 5-6: elution fractions of 300 mM Imidazole.
Figure 7:
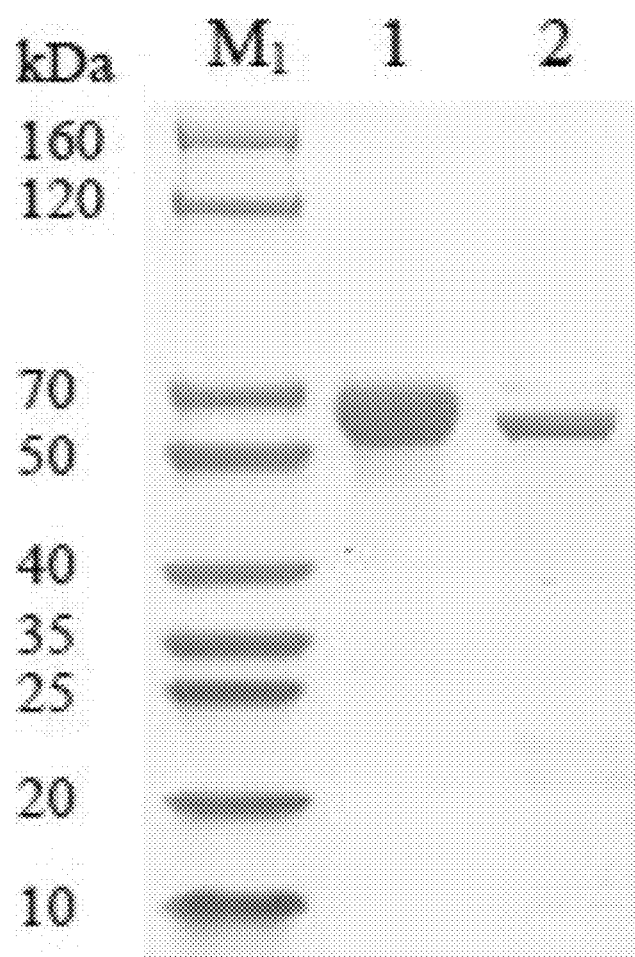
FIG. 7 shows the purity of TPS7 protein analyzed by SDS-PAGE; 1: BSA (2.00 μg); 2: TPS7 protein (1.00 μg); M1: SDS-PAGE Marker.

Example 5 Purification of SgTPS7 Protein Encoded by Germacrene Synthase D Gene of *Sindora glabra* Merr. Ex De Wit The whole bacteria were ultrasonically lysed with 50 mM Tris (pH 8.0), 300 mM NaCl, 20 mM Imidazole containing 1% Triton X-100, 1 mM DTT, and 1 mM PMSF for 45 min, and the supernatant and precipitate were collected respectively after centrifugation. The Ni-IDA affinity chromatography column was equilibrated with 50 mM Tris (pH 8.0), 300 mM NaCl, and 20 mM Imidazole buffer, and the target protein was eluted with equilibration buffers with different imidazole concentration. The elution fractions were analyzed and detected by SDS-PAGE, as shown in FIG. 6, where the arrow indicates the SgTPS7 protein. After purification by Ni-IDA affinity chromatography, the elution fractions with relatively high purity and concentration were collected and dialyzed into 1×PBS (pH 7.4), 5% Glycerol, filtered with a 0.22 μm filter after dialysis was completed, and aliquoted and frozen at −80° C. The protein concentration was determined using a Bradford protein concentration assay kit, as shown in FIG. 7, and the protein concentration of SgTPS7 protein was 0.240 mg/ml.

Figure 8:
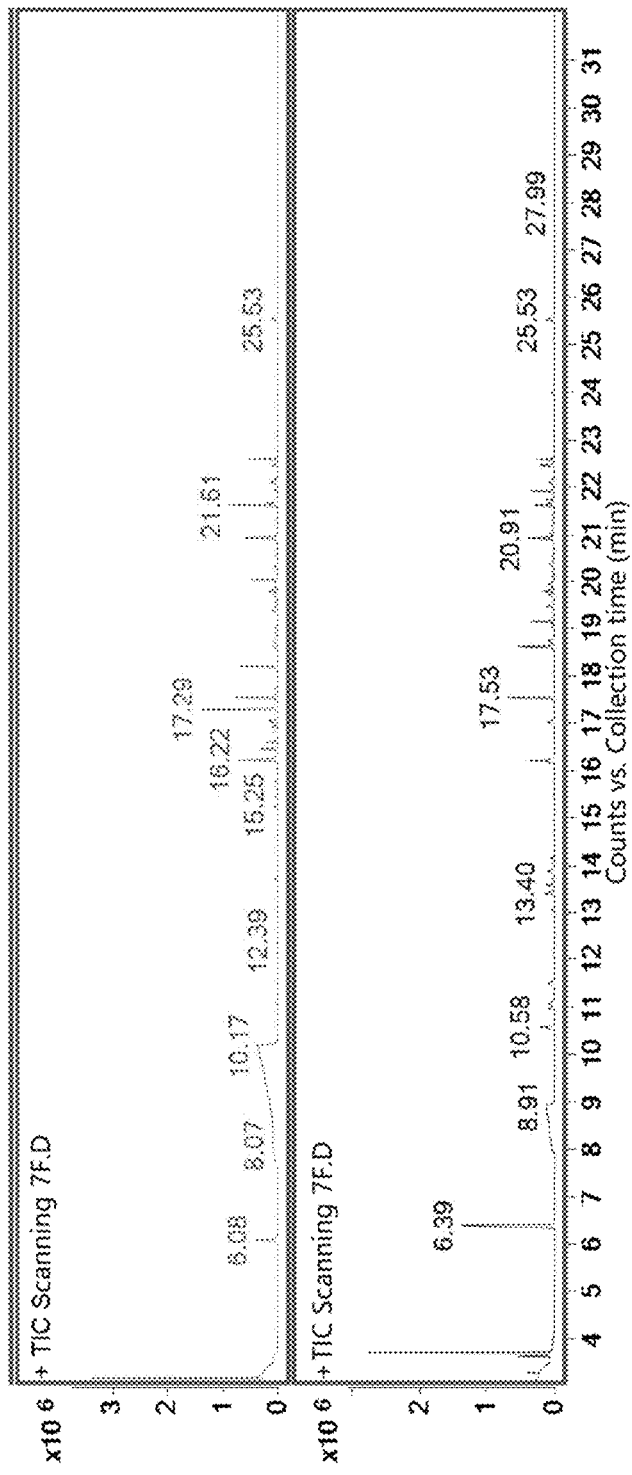
FIG. 8 is view showing the catalysate result of sesquiterpenoid synthase SgTPS7 of *Sindora glabra* Merr ex de Wit detected by GC-MS.

Example 6 Biochemical Function of Germacrene Synthase SgTPS7 of *Sindora glabra* Merr. Ex De Wit Farnesyl pyrophosphate (FPP) or geranyl pyrophosphate (GPP) was used as the substrate. The enzymatic reaction system included: 25 mM Tris-HCl (pH 7.4), 5 mM dithiothreitol (DTT), 100 mM potassium chloride, 5 mM magnesium chloride and 10% glycerol, and the substrate concentration was 50 μM. 50 μg of purified sesquiterpene synthase SgTPS7 protein of *Sindora glabra* Merr. ex de Wit was added and placed at 37° C. for reaction for 1 h. After the reaction was completed, headspace extraction of the volatile substances was performed for 30 min with solid phase microextraction SPME fiber PDMS 100 μm, followed by desorption at 250° C. for 3 min and sample injection. The catalytic products were detected by using GC-MS (Agilent GC-MS 7890B-5977A). The gas chromatography column was HP-5MS (30 m×0.25 mm); the flow rate of carrier gas high-purity He was 1.0 mL/min; the temperature rising program included: held at 50° C. for 1 min, heated to 80° C. at a rate of 5° C./min, held for 1 min, then heated to 220° C. at a rate of 10° C./min, and held for 10 min; the temperature of sample injection port was 250° C., the temperature of the ion source EI 70 eV was 230° C.; the interface temperature was 250° C.; the collection mass range was 30-200 amu; and the data were searched through the NIST 14 mass spectrometry library and compared with the standard spectrum to identify the peaks of individual components. The total ion current of the sample is as shown in FIG. 8. When FPP is used as the substrate, peaks appear at retention times of 16.46, 16.60, 17.29, and 18.20, respectively. After searching in the NIST 14 data retrieval library and comparing, the results show that the corresponding compounds are β-Ylangene, β-Copaene, Germacrene D, and Nerolidol, as shown in FIG. 8, among which Germacrene D is the main compound. When GPP is used as the substrate, a peak appears at a retention time of 10.98. After searching in the NIST 14 data retrieval library and comparing, the results show that the corresponding compound is Linalool, as shown in FIG. 8. This indicates that the sesquiterpene synthase SgTPS7 of *Sindora glabra* Merr. ex de Wit belongs to the germacrene synthase, and can catalyze FPP to synthesize four sesquiterpene compounds, among which germacrene is the main product, and can catalyze GPP to synthesize linalool monoterpene compounds.

The various embodiments in this specification are described in a progressive manner, and each embodiment focuses on the differences from other embodiments. For the same or similar parts between the various embodiments, reference may be made to each other.

The above description of the disclosed embodiments enables one skilled in the art to implement or use the present disclosure. Various modifications to these embodiments will be obvious to one skilled in the art, and the general principles defined herein may be implemented in other embodiments without departing from the spirit or scope of the present disclosure. Therefore, the present disclosure will not be limited to the embodiments shown herein, but rather conform to the widest scope consistent with the principles and novel features disclosed herein.

The invention claimed is:

1. A method for synthesizing germacrene D, comprising the steps of:
   (a) isolating RNA from stem tissue of *Sindora glabra* Merr. ex de Wit, synthesizing cDNA by reverse transcription with the RNA, obtaining an SgTPS7 gene fragment through PCR amplification, cloning the SgTPS7 gene fragment into a pUCm-T vector after electrophoretic verification, transforming the pUCm-T vector into an *Escherichia coli* Trans-T1, screening positive clones for sequencing verification, and extracting a recombinant plasmid having the SgTPS7 gene fragment;
   (b) performing codon optimization on the nucleotide coding sequence of the SgTPS7 gene to obtain an optimized SgTPS7 gene nucleotide sequence comprising SEQ ID NO: 2, and inserting the optimized SgTPS7 gene into a prokaryotic expression vector via restriction enzyme sites to construct a recombinant plasmid;
   (c) transforming the recombinant plasmid into an *Escherichia coli* BL21 (DE3) to produced transformed bacterial cells, inducing protein expression of a SgTPS7 recombinant protein encoded by the SgTPS7 gene fragment in the transformed bacterial cells with an inducer, collecting the transformed bacterial cells, lysing the transformed bacterial cells, and purifying the SgTPS7 recombinant protein; and
   (d) reacting the purified SgTPS7 recombinant protein with a terpenoid precursor substrate in a buffer system containing magnesium ions and a reducing agent, wherein the substrate is selected from farnesyl pyrophosphate (FPP) or geranyl pyrophosphate (GPP) to obtain germacrene D.

2. A method for synthesizing germacrene D, comprising the steps of:
   (a) isolating RNA from root, stem, and leaf tissues of *Sindora glabra* Merr. ex de Wit using an RNA extraction kit, synthesizing cDNA using a reverse transcription with the RNA, performing PCR amplification with high-fidelity DNA polymerase using the cDNA as a template to obtain an SgTPS7 gene fragment, detecting the amplification product via 1.2% agarose gel electrophoresis, excising and purifying the SgTPS7 gene fragment, cloning the SgTPS7 gene fragment into a pUCm-T vector, transforming the pUCm-T vector into *Escherichia coli* Trans-T1, screening positive clones for sequencing verification, and extracting a recombinant plasmid having the SgTPS7 gene fragment;
   (b) optimizing the nucleotide sequence of the SgTPS7 gene using codon optimization software to obtain an optimized SgTPS7 gene nucleotide sequence comprising SEQ ID NO: 2, introducing NdeI and HindIII restriction sites at both ends of the optimized SgTPS7 gene, obtaining a synthetic gene fragment via full-length gene synthesis having SEQ ID NO: 2, and inserting the synthetic gene fragment into an expression vector pET30a via NdeI/HindIII double digestion to construct a recombinant expression plasmid pET30a-SgTPS7;
   (c) transforming the recombinant expression plasmid pET30a-SgTPS7 into *Escherichia coli* BL21 (DE3) competent cells, plating on LB solid medium containing kanamycin, inoculating a single colony into LB liquid medium with kanamycin, shaking at 37° C. until OD600 reaches 0.5-0.8, adding 0.2 mM IPTG for induction at 15° C. for 16 hours to induce expression of a SgTPS7 recombinant protein encoded by the SgTPS7 gene fragment, centrifuging to collect cells, suspending the collected cells in a lysis buffer and lysing the cells, wherein the lysis buffer contains 50 mM Tris-HCl PH 8.0, 300 mM NaCl, 20 mM imidazole, 1 mM DTT, 1 mM PMSF, centrifuging the lysate to collect a supernatant, purifying the SgTPS7 recombinant protein via Ni-IDA affinity chromatography, dialyzing eluted fractions from the Ni-IDA affinity chromatography containing SgTPS7 recombinant protein into PBS buffer containing 5% glycerol, and filter-sterilizing to obtain purified SgTPS7 protein; and
   (d) reacting the purified SgTPS7 protein as a catalyst with a substrate farnesyl pyrophosphate (FPP) or geranyl pyrophosphate (GPP) in a reaction system, wherein the reaction system contains 25 mM Tris-HCl pH 7.4, 5 mM DTT, 100 mM KCl, 5 mM $MgCl_2$, 10% glycerol, 50 M substrate to produce germacrene D.

* * * * *